Jan. 9, 1940.    E. D. YOUMANS    2,186,442
ELECTRIC CABLE
Original Filed June 13, 1935
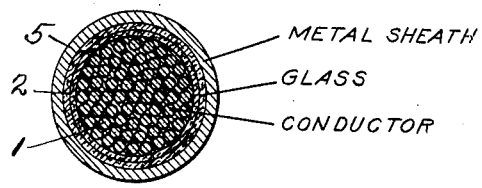
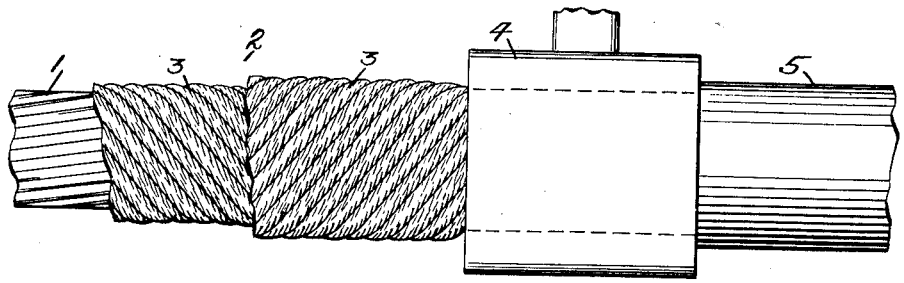
INVENTOR
Edward D. Youmans.
BY
Kiddle, Bethell and Montgomery.
ATTORNEYS.

Patented Jan. 9, 1940

2,186,442

UNITED STATES PATENT OFFICE 2,186,442

ELECTRIC CABLE

Edward D. Youmans, Clifton, N. J., assignor to The Okonite Company, Passaic, N. J., a corporation of New Jersey Original application June 13, 1935, Serial No. 26,334. Divided and this application November 5, 1935, Serial No. 48,289

4 Claims. (Cl. 174—102)

This invention is directed to an improvement in electric cables, and has for one of its objects the provision of an electric cable insulated with glass and enclosed in a metal sheath, the internal diameter of this sheath being much smaller than the outside diameter of the insulation, so that after the sheath has been applied the insulation is held compacted and compressed.

In making up my improved cable I apply the glass to the conductor in any convenient fashion, until an insulating wall is built up of materially greater thickness than is desired in the finished cable, and then I may run the assembly through a lead press where a metal sheath is extruded about the same in such a fashion as to compress the glass insulation to the wall thickness desired. I find that in such a cable the glass provides a uniformly compact insulating wall.

In the drawing wherein I have illustrated an embodiment of my invention:

Fig. 1 is a cross section through the finished product; while

Fig. 2 illustrates diagrammatically one process for making the cable.

Referring to the drawing in detail, I designates the cable conductor which may be of the solid type, or the stranded type as illustrated.

About this conductor I apply a wall of insulation 2, which may take the form of compressible servings 3 of glass roves, as illustrated, or the same may be in the form of glass wool or compressible braid of glass.

The insulating wall is built up to a thickness which is materially greater than it is to be finally. I have found it good practice to build up the wall at this stage to about twice its eventual thickness.

Finally about this insulation I apply a metal sheath, the inside diameter of which is materially less than the original outside diameter of the insulation. If the original thickness of the insulation is twice its eventual thickness the inside diameter of the sheath is proportioned accordingly. A convenient way of proceeding is as illustrated in Fig. 2, where the insulated conductor is shown passing into a lead press shown diagrammatically at 4, the die of which is so set as to extrude a lead or alloy sheath 5 about the glass insulation 3, having an inside diameter materially less than the original outside diameter of the insulation, so as to compact and compress the same to the desired wall thickness. As above mentioned good results are obtained where the outside diameter of the insulation is reduced to an extent where the original wall thickness of the insulation is reduced one half.

It will be seen from all of the foregoing that my invention provides an electric cable, the conductor of which is insulated with glass, held materially compacted and compressed by an enclosing metal sheath.

This application is a division of my co-pending application Serial No. 26,334, filed June 13, 1935.

What I claim is:

1. An electric cable comprising a conductor, a fibrous glass layer under compression to eliminate voids in the glass layer and a metallic sheath tightly embracing the glass and maintaining it under compression.

2. An electric cable comprising in combination a conductor, an enclosing sheath, and a serving of glass roves intermediate the conductor and sheath held under sufficient compression by the sheath substantially to eliminate voids in the said serving.

3. An electric cable comprising in combination a conductor, an enclosing sheath, and a glass braid intermediate the conductor and sheath and held under sufficient compression by the sheath substantially to eliminate voids in the braid.

4. An electric cable comprising in combination a conductor, an enclosing sheath, and a glass wool intermediate the conductor and sheath held under sufficient compression by the sheath substantially to eliminate voids in the glass wool.

EDWARD D. YOUMANS.